Nov. 20, 1934.  R. L. SWENSON  1,981,713
INCREMENT MEASURING INSTRUMENT
Filed March 23, 1933
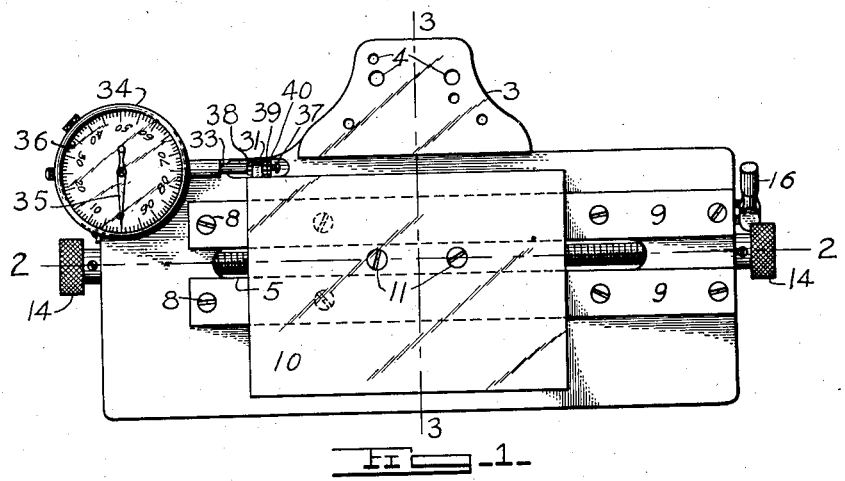
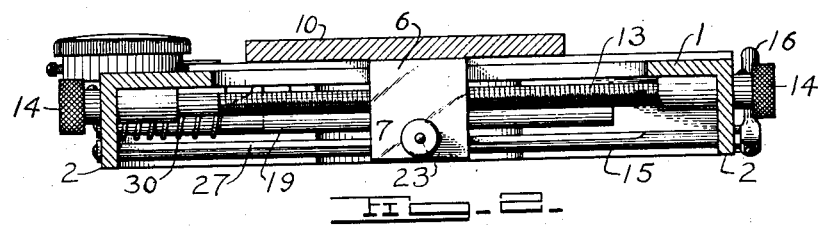
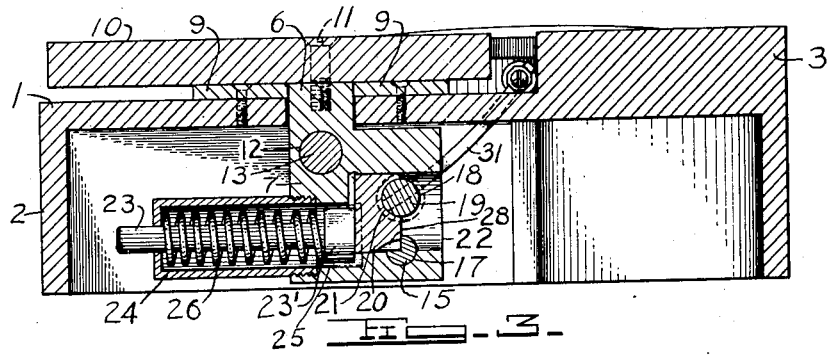

Patented Nov. 20, 1934

1,981,713

UNITED STATES PATENT OFFICE 1,981,713

INCREMENT MEASURING INSTRUMENT

Roy L. Swenson, Washington, D. C., dedicated to the free use of the public

Application March 23, 1933, Serial No. 662,241

6 Claims. (Cl. 33—174)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public in the territory of the United States of America to take effect upon the granting of a patent to me.

This invention relates to an increment measuring instrument adapted to measure a series of distances, such as the cambium layers of trees which form the annular rings in a cross-section of a tree trunk.

It has been found that there is an outstanding relation between the thickness of cambium layers and forest insect pests, weather conditions, and other factors governing the growth of trees. These factors are therefore studied by measuring the thickness of cambium layers of many trees in a forest and since one layer is formed each year in each tree, it is apparent that many measurements must be made. One object of the present invention is to provide an instrument whereby the aforementioned measurements may be quickly and accurately made.

Another object of the invention is to provide a means for indicating directly the thickness of a cambium layer and a means for returning the indicating means to zero in order that a direct reading of the thickness of another cambium layer may be obtained.

Another object of the invention is to provide a movable means to support a portion of a tree trunk in predetermined position, a means whereby the supporting means may be moved an amount equal to the thickness of a cambium layer, and a means for determining the amount of movement of the support.

Another object of the present invention is to provide a movable table for supporting a portion of a tree trunk in a predetermined position, a means whereby the table may be moved a distance equal to the thickness of a cambium layer, a means for indicating directly the amount of such movement, and a means whereby the indicating means may be returned to zero immediately after the indication has been made so that a direct indication of the thickness of another layer may be obtained.

Other objects of the invention will appear as the description proceeds. While the invention is described as being adaptable for use in measuring cambium layers, it is obvious that its use is not limited to such measurements alone but may be used to measure any distance or any spaced or successive distances, such as laminæ of mica, strata formations, etc.

The invention is shown in the drawing in which Fig. 1 is a plan view of the invention; Fig. 2 is a longitudinal cross-sectional view through line 2—2 of Fig. 1; and Fig. 3 is a transverse cross-sectional view through line 3—3 of Fig. 1.

Similar numerals refer to similar parts throughout the several views.

A substantially rectangular base 1 having depending peripheral walls including end walls 2 has an extension 3 at substantially the middle of one of the longitudinal sides of base 1. The top of extension 3 may be above the upper surface of base 1, as shown in Fig. 3, and an optical sighting instrument having cross hairs perpendicular to each other is secured to extension 3 by means of screws or projections entered into holes 4. Base 1 has an elongated slot 5 through approximately its longitudinal center adapted to receive an upwardly projecting portion 6 of a table carrier 7. Mounted on base 1 at each side of slot 5 by means of screws 8 are two guide rails 9 upon which slides table 10 fixed to the projecting portion 6 of carrier 7 by screws 11.

Carrier 7 has a threaded opening 12 extending parallel to the side edges of base 1 which opening receives a threaded rod 13 journalled in the end walls 2 and having knurled heads 14 projecting beyond the end walls. Also, journalled in end walls 2 is a release rod 15 having a handle 16 outside of the end wall of the base. Release rod 15 passes slidably through opening 17 in carrier 7 parallel to opening 12. Table carrier 7 has a third opening 18 parallel to openings 12 and 17. Slidably mounted in opening 18 is a rod 19 which is adapted to be releasably frictionally held fixed relative to carrier 7 by a block 20.

Block 20 is substantially rectangular in cross-section, as seen in Fig. 3, and has a semi-cylindrical groove 21 engaging rod 19. Block 20 is positioned in opening 22 extending partially through carrier 7 from one side face thereof, the opening 22 having its axis at right angles to the axes of openings 17 and 18 and intersecting a portion of opening 18 and the upper half of a portion of opening 17. Block 20 has a limited amount of movement between the inner end of opening 22 and rod 19. Plunger 23 having a head 23' engaging block 20 is supported at its free end in a housing 24 threadedly engaged in the walls of opening 25 in carrier 7, the opening 25 being of smaller diameter than and communicating with opening 22 and extending in the opposite direction from and parallel to opening 22. Disposed in housing 24 and surrounding plunger 23 is a coil spring 26 which presses head 23' against block 20, spring 26 being sufficiently strong to cause carrier 7 and rod 19 to move as a unit longitudinally of the slot 5. Plunger 23 maintains spring 26 in its proper position.

Release rod 15 is cylindrical and has a groove 27 extending from that end of rod 15 opposite to that carrying handle 16 and extending along rod 15 a distance greater than the length of slot 5, as shown in Fig. 2. Groove 27 is so shaped that the cross-section of rod 15 along groove 27 is bounded by a right angle and three-quarters of a circle, as clearly shown in Fig. 3. Groove 27 is so disposed that one wall of the groove is adapted to engage one corner of block 20 when rod 15 is rotated by movement of handle 16. The block 20 at this corner has a small groove 28 to prevent jamming of block 20 and rod 15.

One end of rod 19 slides through the end wall 2 toward which table 10 is moved when a measurement is being taken. Surrounding said one end of rod 19 is a compression coil spring 30 having one end abutting the end wall 2 and having the other end abutting an arm 31.

The arm 31 is fixed to that end of rod 19 which carries spring 30 and the free end of arm 31 projects through a slot 32 in the base 1. Detachably connected to arm 31 at its end which projects through slot 32 is the plunger or stem 33 of a dial indicator 34, such as that described in United States Letters Patent No. 1,619,370 to C. C. Robbins, granted March 1, 1927 having pointer 35 operating over dial 36. Indicator 34 is suitably mounted on base 1 by any suitable means. As described in said Letters Patent to Robbins, dial 36 is adjustable so that the pointer 35 may indicate zero before a particular measurement is taken.

As above stated arm 31 and plunger 33 are detachably connected together. For this purpose, screw 37 is threaded into the end of plunger 33 and locked in adjusted position by a nut 38. Screw 37 passes through a suitable opening in the end of arm 31 which projects through slot 32 and the arm 31 and screw 37 are held in adjusted position by nut 39, an additional nut 40 being provided to lock nut 39.

The operation of the subject matter of this invention is as follows: A cross-section of a portion of a tree trunk is placed on the table 10 in such position that one cross-hair of the optical sighting instrument mounted on extension 3 is radial of the cambium layers whose thickness is to be measured. One knurled head 14 is turned thereby rotating screw 13 and shifting carrier 7 and table 10 until the other cross-hair of the optical sighting instrument is tangential to that edge of a cambium layer nearer the dial indicator 34. Dial 36 is shifted to position the zero under the pointer as hereinafter described.

Knurled head 14 is now turned to shift table 10 and carrier 7 until said other cross-hair of the optical sighting instrument on the extension 3 is tangential to the edge of the cambium layer to be measured remote from dial indicator 34. This movement of table 10 and carrier 7 is transmitted by arm 31, connection 37—40, and plunger 33 to move pointer 35 over dial 36. After the movement has been completed, pointer 35 will indicate on dial 36 the thickness of the cambium layer.

In order to measure the thickness of another cambium layer, head 14 is turned until table 10 has positioned the portion of tree thereon so that the edge of the layer to be measured nearer the indicator 34 is tangential to the cross-hair of the optical sighting instrument on extension 3. Pointer 35 of indicator 34 now may not be at the zero graduation of dial 36 and to avoid unnecessary delay due to calculations, it is desirable that pointer 35 should read zero before the measurement is taken. Otherwise, it will be necessary to subtract the now existing indication of indicator 34 from its indication after table 10 has been shifted the distance equal to the thickness of the cambium layer.

The casing of dial 34 is of such design that it may be rotated with relation to the pointer, to zeroize the pointer at any position. When rod 19 is urged to its extreme right, the casing is set to the zero position manually and held in place by friction.

To set the pointer 35 at its zero position, handle 16 is depressed causing release rod 15 to pivot and the vertical wall of groove 27 to push block 20 against the resistance of spring 26. This movement of block 20 frees rod 19 which is shifted by either one or both of the forces of spring 30 and the spring of indicator 34. Rod 19 is shifted until its movement is stopped by the internal mechanism of indicator 34, at which time, pointer 35 will indicate zero on dial 36.

The instrument is now ready to be operated to measure the thickness of another cambium layer in the manner described above in the operation for measurement of the first mentioned layer.

The above described operations are repeated for each layer to be measured.

From the above description, it is apparent that the instrument provides an accurate and efficient means for quickly measuring the thickness of cambium layers or a distance or a series of distances on any object. It is obvious that numerous changes in form, size, construction, and arrangement of the several parts may be made without departing from the spirit of the invention and without sacrificing any of its advantages and that the invention is limited only by the scope of the accompanying claims;

I claim:

1. A device for measuring a series of dimensions of different parts of an object, comprising in combination, movable means for supporting the object in predetermined position, means for moving said supporting means a distance equal to one of said dimensions, an indicating means, means connecting said indicating means and said supporting means, said connecting means having frictional engagement with said supporting means, means for releasing said frictional engagement after the supporting means has been moved said distance equal to one of said dimensions, and means for restoring said frictional engagement after operation of the releasing means.

2. A device of the class described, comprising in combination, an elongated base having a longitudinal slot therein, a table slidable on one side of said base, a table carrier on another side of said base and having a portion extending through said slot and fixed to said table, said carrier having a threaded opening parallel to said slot, a screw journalled in said base and engaging said threaded opening, a dial indicator mounted on said base and having a stem, said indicator being adapted to read zero, said carrier having a second opening parallel to the threaded opening, a rod extending through said second opening and having an arm, a connection between said arm and said stem, a spring connected to said rod and forcing said rod in a direction tending to set the indicator to zero, a block slidably carried by said carrier and frictionally engaging said rod, spring means for pressing said block into engagement with said rod, said carrier having a third opening parallel to said threaded opening, and a rod journalled in said base, extending through said third opening, and having means engageable with said block for moving the block against the resistance of the spring means, thereby permitting said first mentioned spring to return the dial indicator to zero.

3. A device of the class described, comprising in combination, a base, a table movable on said base, means journalled in said base for moving said table, a dial indicator for indicating the movement of said table and having a zero indication, an operative connection between said table and said indicator, said connection including releasable spring pressed friction means connected to said table, resilient means cooperating with said connection to return said indicator to zero indication when said friction means is released, and means for releasing said friction means.

4. A measuring instrument comprising in combination, a base, means slidable on said base for supporting an object to be measured, means cooperating with said supporting means for moving said supporting means and object a distance proportional to that to be measured, a dial indicator having a zero indication, means operatively connecting said supporting means to said dial indicator, said connecting means including a rod slidably engaging said supporting means, means urging said rod in a direction to return said indicator to zero indication, means cooperating with said rod and said supporting means for causing said rod and said supporting means to move as a unit, means cooperating with said means last named for permitting said rod to slide relative to said supporting means whereby said urging means may slide said rod and cause said indicator to return to zero indication in preparation for another measurement.

5. A measuring instrument comprising in combination, movable means for supporting an object to be measured, means for moving said movable means, indicating means having a zero indication, an operative connection between said movable means and said indicating means, said connection including parts having releasable engagement with each other, means for causing the release of the engagement of said parts, means for causing said indicating means to be set at zero indication upon the release of said parts, and means for causing the engagement of said releasable parts when said release causing means is inoperative.

6. A measuring instrument comprising in combination, a base, object supporting means movable on said base, indicating means having a zero indication and mounted on said base, a rod carried by and having slidable engagement with said supporting means, an arm connecting said rod and said indicating means, means for preventing sliding of said rod relative to said supporting means and thereby causing said supporting means and said rod to move as a unit, and means for rendering said means last named inoperative to permit sliding movement between said rod and supporting means, whereby said indicating means may be returned to zero indication without movement of said supporting means.

ROY L. SWENSON.